(12) United States Patent
Moores et al.

(10) Patent No.: US 8,016,241 B2
(45) Date of Patent: Sep. 13, 2011

(54) SELF SUPPORTING CELLULAR THERMAL ACOUSTIC INSULATION

(75) Inventors: Nigel G. Moores, Mokilteo, WA (US); George F. Nicholas, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/830,498

(22) Filed: Jul. 30, 2007

(65) Prior Publication Data

US 2009/0032640 A1 Feb. 5, 2009

(51) Int. Cl.
*B64G 1/52* (2006.01)

(52) U.S. Cl. ..................... 244/171.7; 244/119

(58) Field of Classification Search .................. 244/119; 220/560.15, 592.1, 592.25, 592.26, 902; 52/404.5, 407.3, 407.4, 407.5, 742.1, 742.12
See application file for complete search history.

(56) References Cited

U.S. PATENT DOCUMENTS

| | | | | |
|---|---|---|---|---|
| 3,231,944 A * | 2/1966 | Bennett | .......................... | 52/406.1 |
| 3,338,013 A * | 8/1967 | Graham et al. | ............... | 52/302.3 |
| 3,357,585 A * | 12/1967 | Morrison | ................... | 220/592.25 |
| 3,740,905 A * | 6/1973 | Adams | .......................... | 52/404.3 |
| 3,867,244 A * | 2/1975 | Adams | .......................... | 428/182 |
| 4,235,398 A * | 11/1980 | Johnson | .......................... | 244/119 |
| 4,291,851 A * | 9/1981 | Johnson | .......................... | 244/119 |
| 4,318,260 A * | 3/1982 | Siegel et al. | ................... | 52/407.4 |
| 4,657,798 A * | 4/1987 | Guilhem | .......................... | 428/71 |
| 6,361,055 B1 * | 3/2002 | Grover | .......................... | 277/652 |
| 6,886,783 B2 * | 5/2005 | Guard et al. | ................... | 244/119 |
| 7,040,575 B2 * | 5/2006 | Struve et al. | ................. | 244/118.5 |
| 2005/0211838 A1 * | 9/2005 | Struve et al. | ................... | 244/119 |
| 2006/0118676 A1 * | 6/2006 | Novak et al. | ............... | 244/129.1 |
| 2006/0145006 A1 * | 7/2006 | Drost | .......................... | 244/118.5 |
| 2006/0194893 A1 | 8/2006 | Prybutok | | |

FOREIGN PATENT DOCUMENTS

WO WO 2005/095206 10/2005

OTHER PUBLICATIONS

International Search Report for PCT Application Serial No. PCT/US2008/068669, dated Dec. 4, 2008.

* cited by examiner

*Primary Examiner* — Tien Dinh
*Assistant Examiner* — Justin Benedik
(74) *Attorney, Agent, or Firm* — Klintworth & Rozenblat IP LLC

(57) ABSTRACT

In one embodiment, a device includes first and second frames members, and a foam insulation member having first and seconds ends. At least one of the first and second ends is disposed at an angle greater than 0 degrees relative to a vertical plane. The first and second ends of the foam insulation member extend between the first and second frame members in compression. The foam insulation member is fixedly held in place between the first and second frame members due to a friction fit resulting from the foam insulation member being disposed between the first and second frame members in compression.

30 Claims, 16 Drawing Sheets

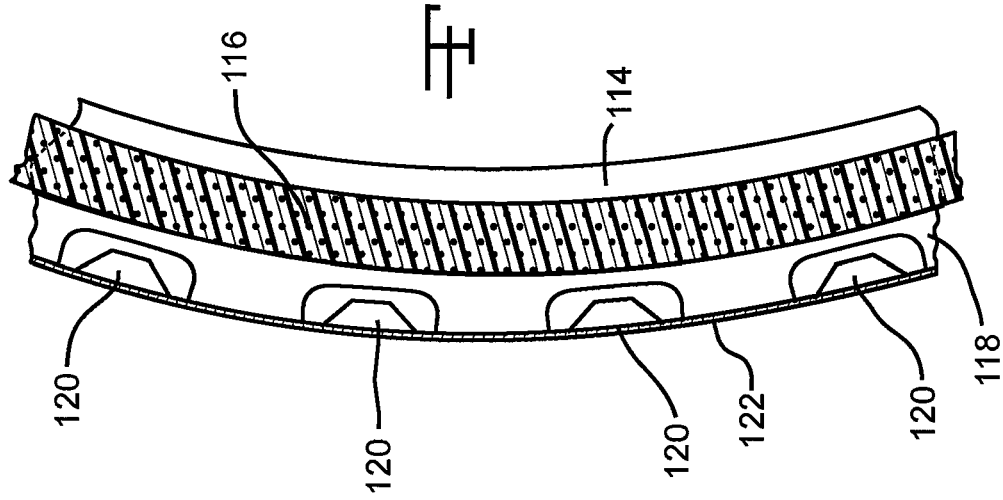
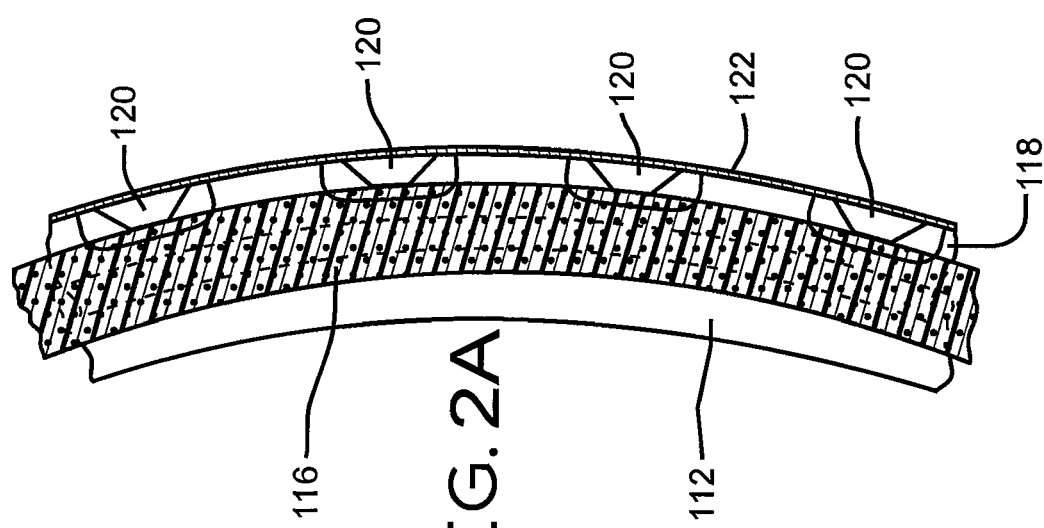

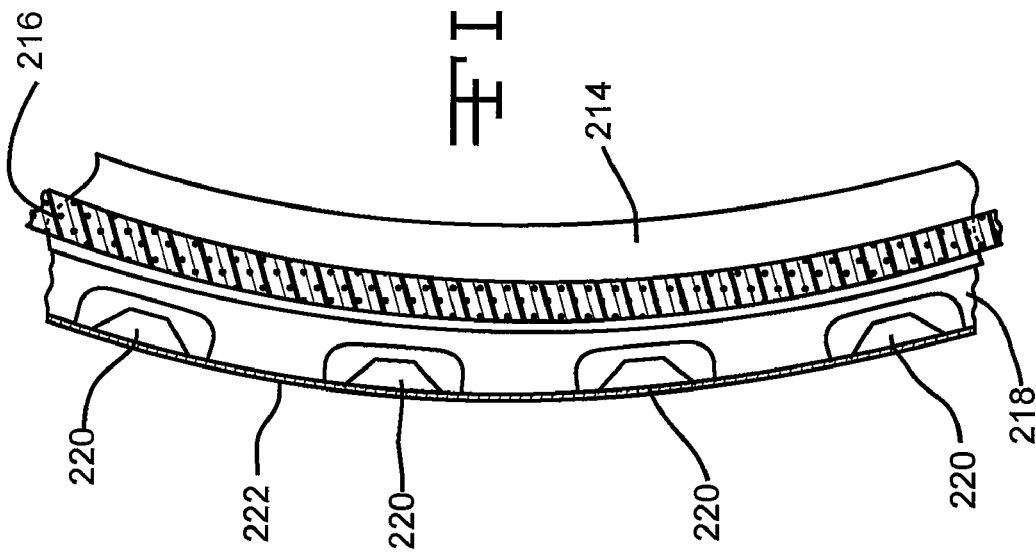
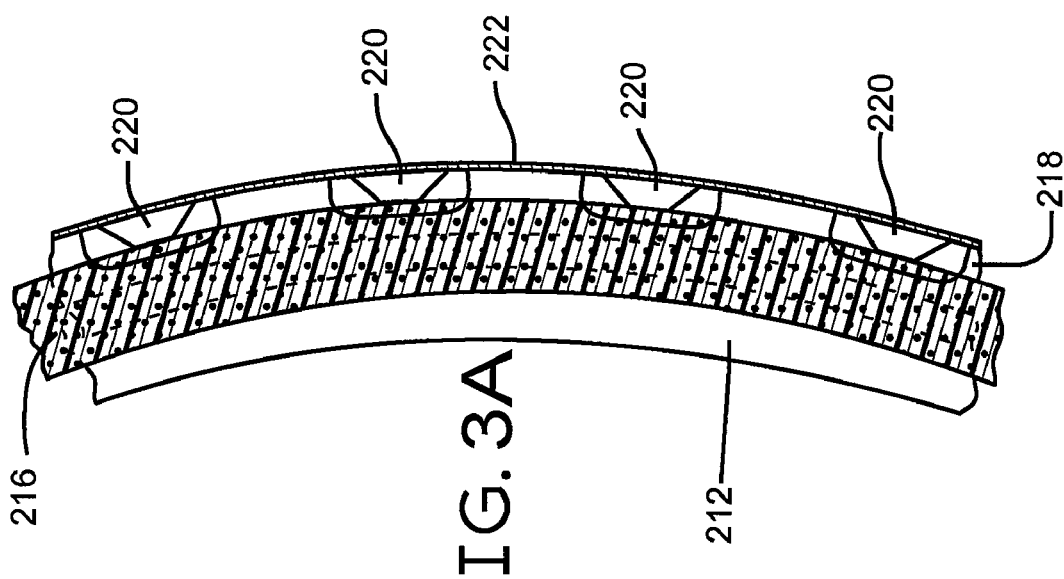
FIG. 3B
FIG. 3A

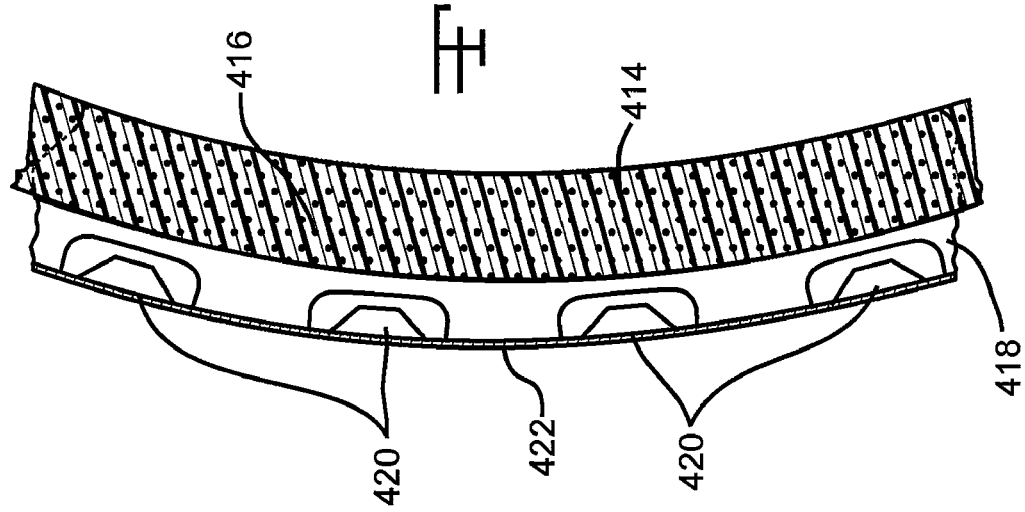
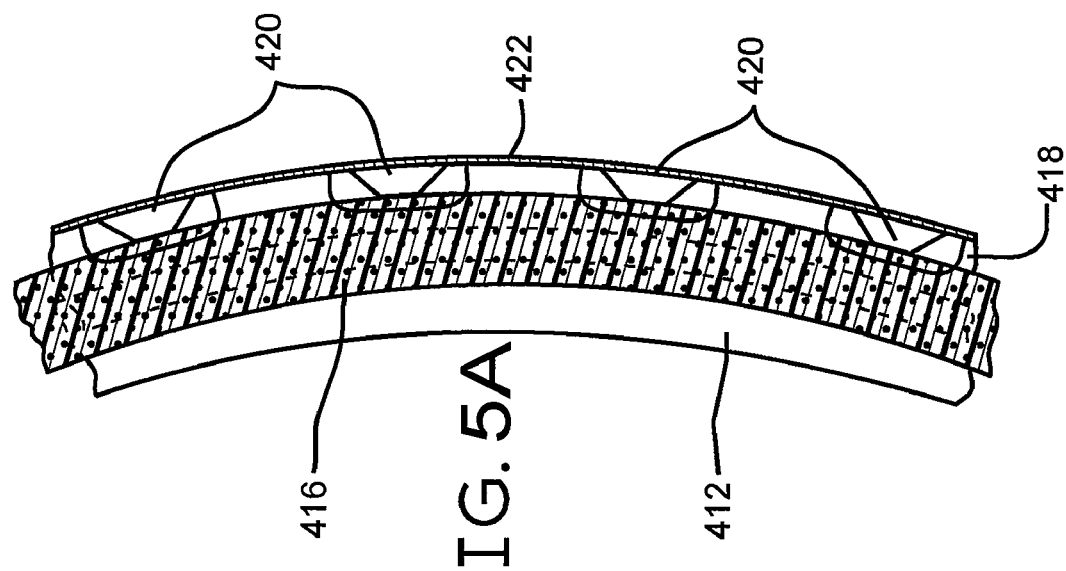

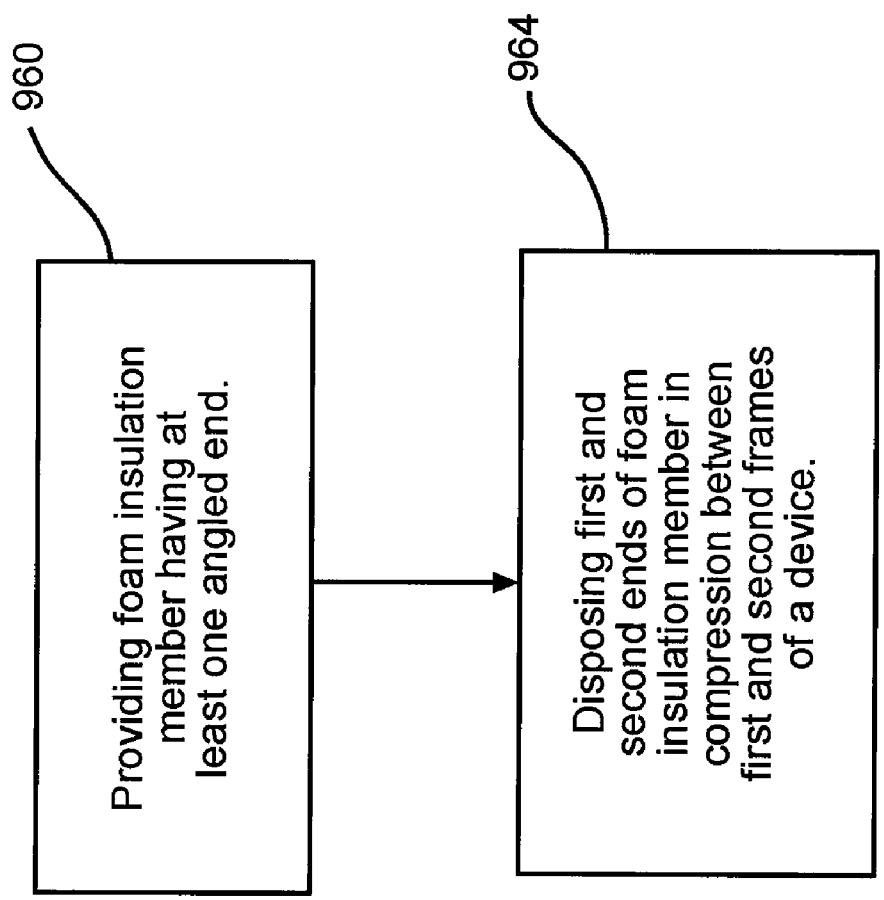

US 8,016,241 B2

SELF SUPPORTING CELLULAR THERMAL ACOUSTIC INSULATION

BACKGROUND

Structures, such as aeronautical structures like aircraft fuselages, often need to be insulated thermally and acoustically utilizing foam insulation members. Typically, foam insulation members are fastened to the fuselage utilizing a large assortment of fastening devices. However, this adds time and cost to the installation process, and the fastening devices add extra weight to the structure. Without utilizing fastening devices, the foam insulation members may become dislodged during shock loads.

A device with a self-retained foam insulation member, and method of installing a self-retained foam insulation member, is needed to decrease one or more problems associated with one or more of the existing devices and/or methods of insulation.

SUMMARY

In one aspect of the disclosure, a device comprises first and second frame members, and a foam insulation member having first and second ends. At least one of the first and second ends is disposed at an angle greater than 0 degrees relative to a vertical plane. The first and second ends of the foam insulation member extend between the first and second frame members in compression. The foam insulation member is fixedly held in place between the first and second frame members due to a friction fit resulting from the foam insulation member being disposed between the first and second frame members in compression. The foam insulation member provides thermal and acoustic insulation to the device.

In another aspect of the disclosure, a method of installing insulation in a device is disclosed. In one step, a foam insulation member is provided having first and second ends. At least one of the first and second ends is disposed at an angle greater than 0 degrees relative to a vertical plane. In another step, the first and second ends of the foam insulation member are disposed in compression between first and second frame members of the device to provide thermal and acoustic insulation to the device. The foam insulation member is fixedly held in place between the first and second frame members due to a friction fit resulting from the foam insulation member being disposed between the first and second frame members in compression.

These and other features, aspects and advantages of the disclosure will become better understood with reference to the following drawings, description and claims.

BRIEF DESCRIPTION OF THE DRAWINGS

FIG. 2A shows a cross-section view through line 2A-2A of the embodiment of FIG. 2;

FIG. 2B shows a cross-section view through line 2B-2B of the embodiment of FIG. 2;

FIG. 3A shows a cross-section view through line 3A-3A of the embodiment of FIG. 3;

FIG. 3B shows a cross-section view through line 3B-3B of the embodiment of FIG. 3;

FIG. 5A shows a cross-section view through line 5A-5A of the embodiment of FIG. 5;

FIG. 5B shows a cross-section view through line 5B-5B of the embodiment of FIG. 5;

FIG. 10 is a flowchart showing one embodiment of a method of installing insulation in a device.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
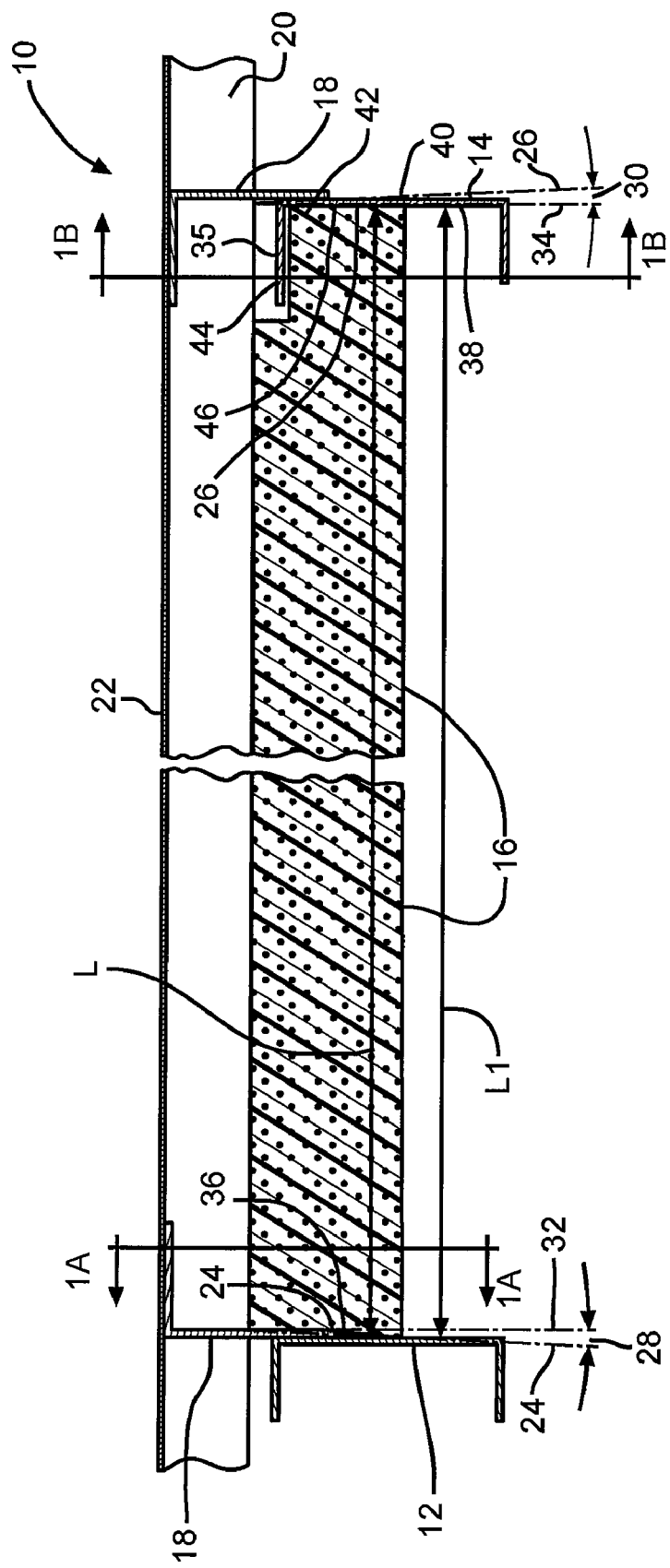
FIG. 1 shows a partial side view of one embodiment of a device.

FIG. 1 shows a partial side view of one embodiment of a device 10. The device 10 may comprise an aeronautical device such as an aerospace fuselage, an aerospace ducting, a missile, a satellite, an aerospace vehicle, an aerospace tank, an aerospace piping, or differing aerospace structures. In other embodiments, the device 10 may comprise any device which requires thermal and acoustic insulation. The device 10 may comprise first and second frame members 12 and 14, a foam insulation member 16, shear-ties 18, stringers 20, and skin 22. The first and second frame members 12 and 14 may be attached to the shear-ties 18, which may be attached to the stringers 20 and skin 22.

The foam insulation member 16 may have first and second ends 24 and 26 each disposed at angles 28 and 30, relative to vertical planes 32 and 34, of 5 degrees. In another embodiment, at least one of the angles 28 and 30 may be disposed at an angle greater than 0 degrees relative to vertical planes 32 and 34. In yet another embodiment, the angles 28 and 30 may each be substantially between 0 and 15 degrees, and at least one of the angles 28 and 30 may be at least 3 degrees. In still anther embodiment, one of the angles 28 and 30 may be at least 5 degrees. The foam insulation member 16 may be made of a material, such as a polymeric, cellular, solid member, which has a density of less than 0.4 pounds per cubic feet, such as Melamine foam or other type of foam material. The foam insulation member 16 may have good thermal insulating and acoustic transmission loss properties to provide thermal and acoustical insulation to the device 10. The second end 26 of the foam insulation member 16 may be defined by a notch 35. In other embodiments, at least one of the first and second ends 24 and 26 of the foam insulation member 16 may be defined by at least one notch.

The length L of the foam insulation member 16 in an uncompressed state is sized larger than the length L1 between the first and second frame members 12 and 14. The 5 degree angles 28 and 30 of the first and second ends 24 and 26 may have been used to wedge the foam insulation member 16 in between the first and second frame members 12 and 14 in compression. The first and second ends 24 and 26 of the foam insulation member 16 may extend in compression between a closed C-shaped portion 36 of the first frame member 12 and an open C-shaped portion 38 of the second frame member 14. The foam insulation member 16 may be fixedly held in place, without fastening elements, between the first and second frame members 12 and 14 due to a friction fit resulting from the foam insulation member 16 being disposed in compression between the first and second frame members 12 and 14. A front portion 40 of the second end 26 of the foam insulation member 16 may be compressed more than a back portion 42 of the second end 26. In other embodiments, a front portion of at least one of the first and second ends 24 and 26 of the foam insulation member 16 may be compressed more than a back portion. A flange portion 44 of the open C-shaped portion 38 may be disposed in the notch 35. The second end 26 of the foam insulation member 16 may fill only part 46 of the open C-shaped portion 38 of the second frame member 14. In another embodiment, the second end 26 of the foam insulation member 16 may fill the entire open C-shaped portion 38 of the second frame member 14.

Figure 1B:
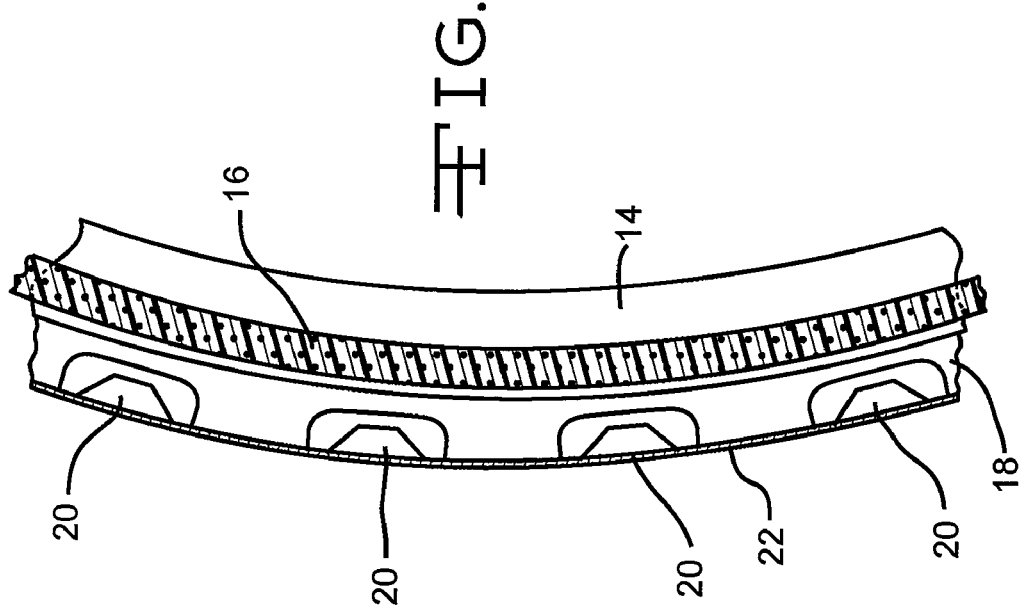
FIG. 1B shows a cross-section view through line 1B-1B of the embodiment of FIG. 1.
Figure 1A:
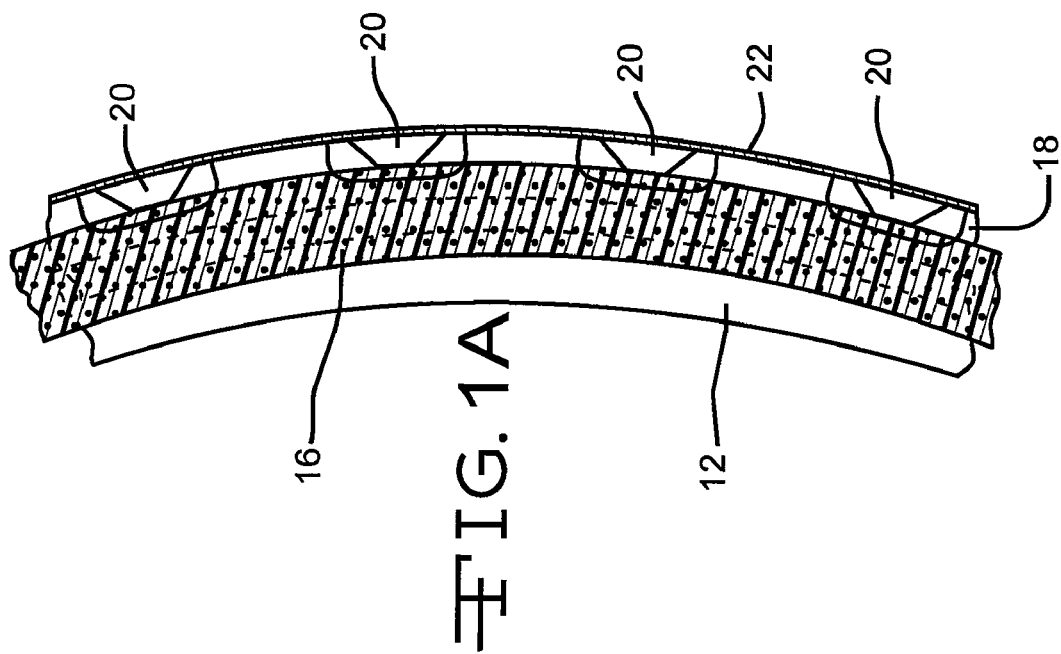
FIG. 1A shows a cross-section view through line 1A-1A of the embodiment of FIG. 1.

FIG. 1A shows a cross-section view through line 1A-1A of the embodiment of FIG. 1. FIG. 1B shows a cross-section view through line 1B-1B of the embodiment of FIG. 1. As shown in FIGS. 1A and 1B, the foam insulation member 16 may be concave shaped. The concave shape of the foam insulation member 16 may aid in retaining the foam insulation member 16 between the first and second frame members 12 and 14 without fastening elements. In other embodiments, the foam insulation member 16 may be in varying shapes, sizes, and configurations. A 9 g drop test was conducted on the embodiment of FIG. 1. The drop test revealed that the foam insulation member 16 substantially stays in position between the first and second frame members 12 and 14, with a very small amount of movement.

FIGS. 2-9 show additional embodiments of devices under the disclosure, each having varying shaped foam insulation members. For each of the embodiments of FIGS. 2-9, the varying shaped foam insulation members are disposed in compression between identically shaped and sized first and second frame members as those disclosed in the embodiment of FIG. 1. Similarly, for each of the embodiments of FIGS. 2-9, the shear-ties, stringers, and skin are identical in shape and size to those disclosed in the embodiment of FIG. 1. As a result, the discussion related to the embodiments of FIGS. 2-9 will concentrate on the differences between the varying shaped foam insulation members.

Figure 2:
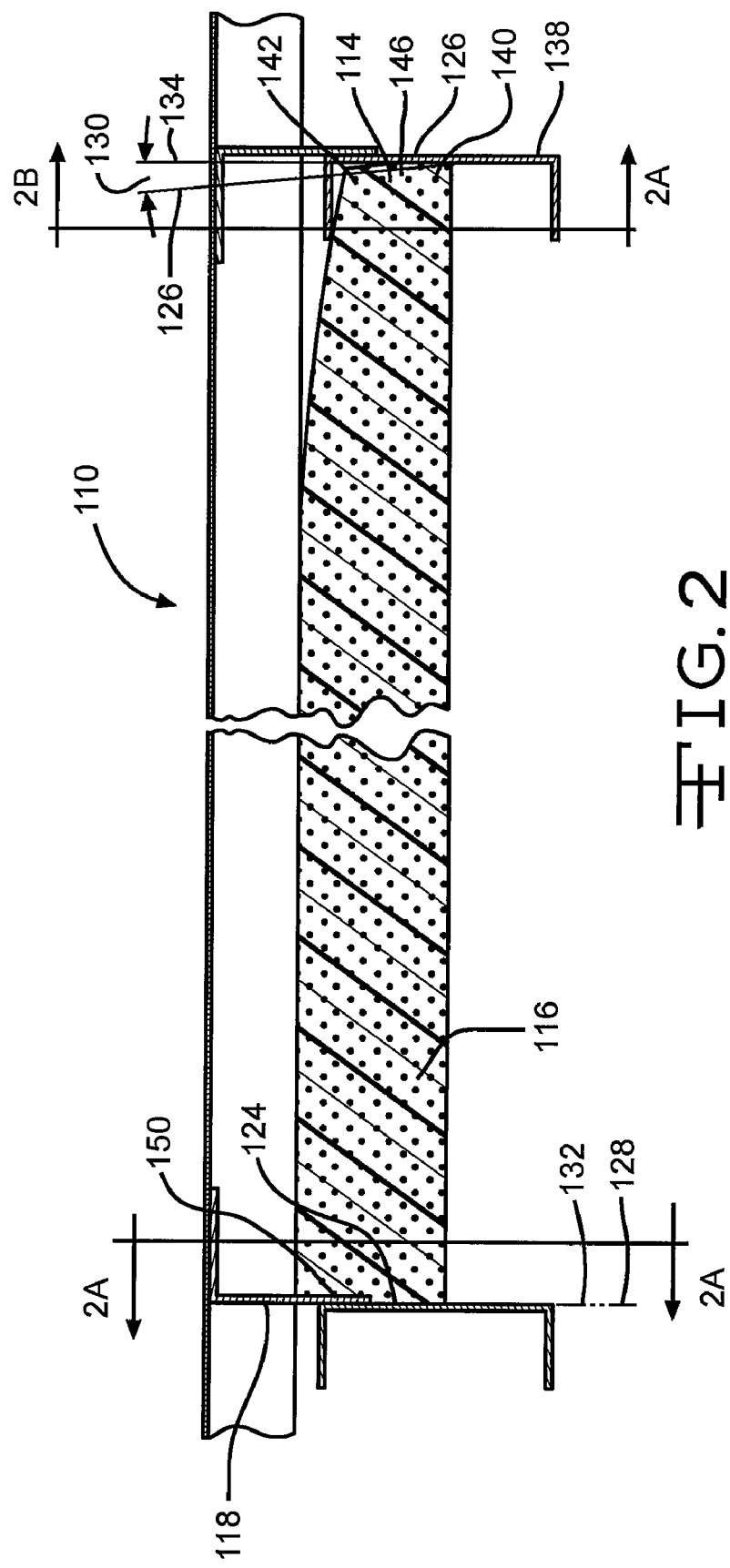
FIG. 2 shows a partial side view of another embodiment of a device.

FIG. 2 shows a partial side view of another embodiment of a device 110. The first end 124 of the foam insulation member 116 is disposed vertically with an angle 128 of 0 degrees with respect to the vertical plane 132. The first end 124 may be defined by a notch 150 into which one of the shear-ties 118 may be disposed. The second end 126 of the foam insulation member 116 may have an angle 130 with respect to the vertical plane 134 of 5 degrees. The second end 126 of the foam insulation member 116 may fill only part 146 of the open C-shaped portion 138 of the second frame member 114. A front portion 140 of the second end 126 of the foam insulation member 116 may be compressed more than a back portion 142 of the second end 126.

FIG. 2A shows a cross-section view through line 2A-2A of the embodiment of FIG. 2. FIG. 2B shows a cross-section view through line 2B-2B of the embodiment of FIG. 2. As shown in FIGS. 2A and 2B, the foam insulation member 116 may be concave shaped to aid in retaining the foam insulation member 116 between the first and second frame members 112 and 114 without fastening elements. A 9 g drop test was conducted on the embodiment of FIG. 2. The drop test revealed that the foam insulation member 116 substantially stays in position between the first and second frame members 112 and 114, with a small amount of movement.

Figure 3:
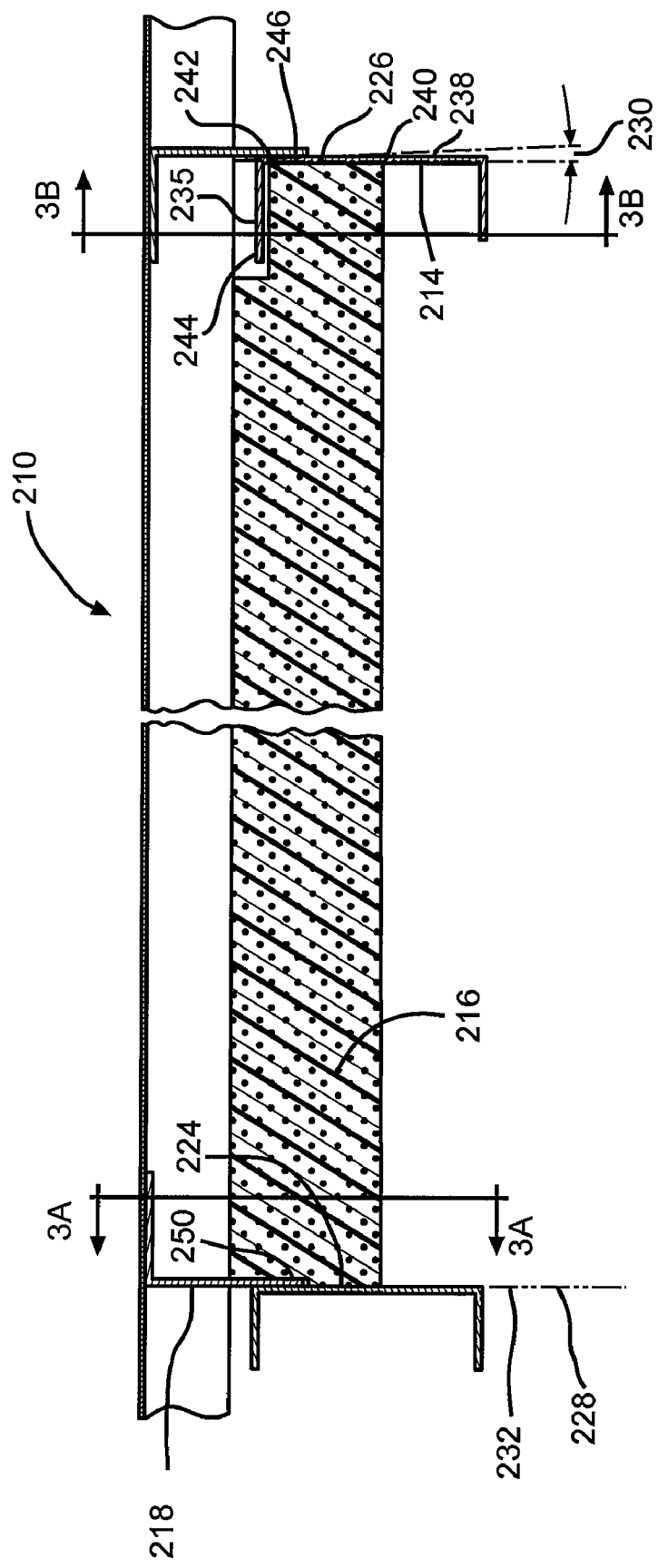
FIG. 3 shows a partial side view of still another embodiment of a device.

FIG. 3 shows a partial side view of another embodiment of a device 210. The first end 224 of the foam insulation member 216 is disposed vertically with an angle 228 of 0 degrees with respect to the vertical plane 232. The first end 224 may be defined by a notch 250 into which one of the shear-ties 218 may be disposed. The second end 226 of the foam insulation member 216 may have an angle 230 with respect to the vertical plane 234 of 5 degrees. The second end 226 of the foam insulation member 216 may fill only part 246 of the open C-shaped portion 238 of the second frame member 214. A flange portion 244 of the open C-shaped portion 238 of the second frame member 214 may be disposed in notch 235 of the second end 226. A front portion 240 of the second end 226 of the foam insulation member 216 may be compressed more than a back portion 242 of the second end 226.

FIG. 3A shows a cross-section view through line 3A-3A of the embodiment of FIG. 3. FIG. 3B shows a cross-section view through line 3B-3B of the embodiment of FIG. 3. As shown in FIGS. 3A and 3B, the foam insulation member 216 may be concave shaped to aid in retaining the foam insulation member 216 between the first and second frame members 212 and 214 without fastening elements. A 9 g drop test was conducted on the embodiment of FIG. 3. The drop test revealed that the foam insulation member 216 substantially stays in position between the first and second frame members 212 and 214, with a small amount of movement.

Figure 4:
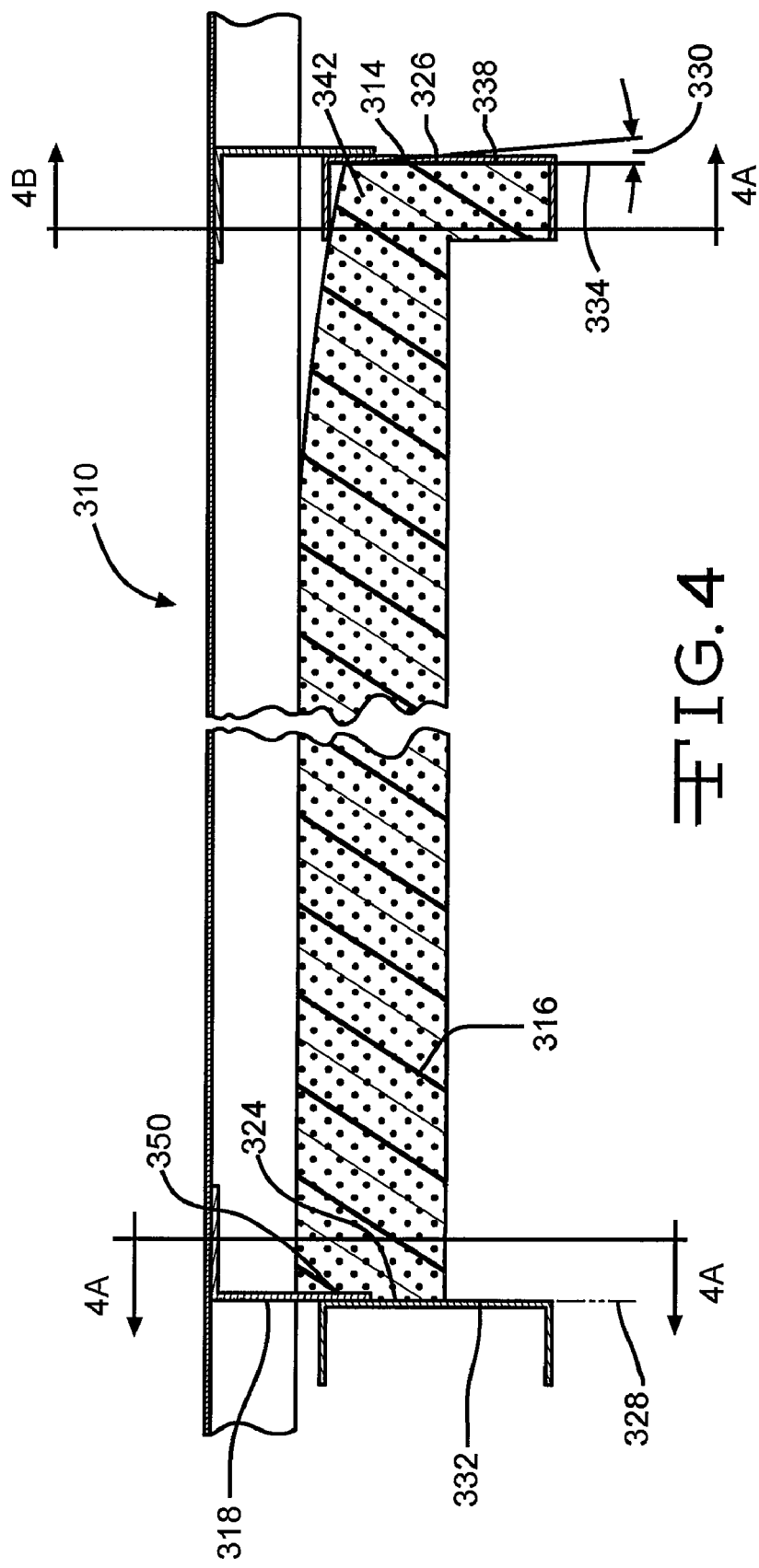
FIG. 4 shows a partial side view of yet another embodiment of a device.

FIG. 4 shows a partial side view of another embodiment of a device 310. The first end 324 of the foam insulation member 316 is disposed vertically with an angle 328 of 0 degrees with respect to the vertical plane 332. The first end 324 may be defined by a notch 350 into which one of the shear-ties 318 may be disposed. The second end 326 of the foam insulation member 316 may have an angle 330 with respect to the vertical plane 334 of 5 degrees. The second end 326 of the foam insulation member 316 may fill the entire open C-shaped portion 338 of the second frame member 314. A front portion 340 of the second end 326 of the foam insulation member 316 may be compressed more than a back portion 342 of the second end 326.

Figure 4A:
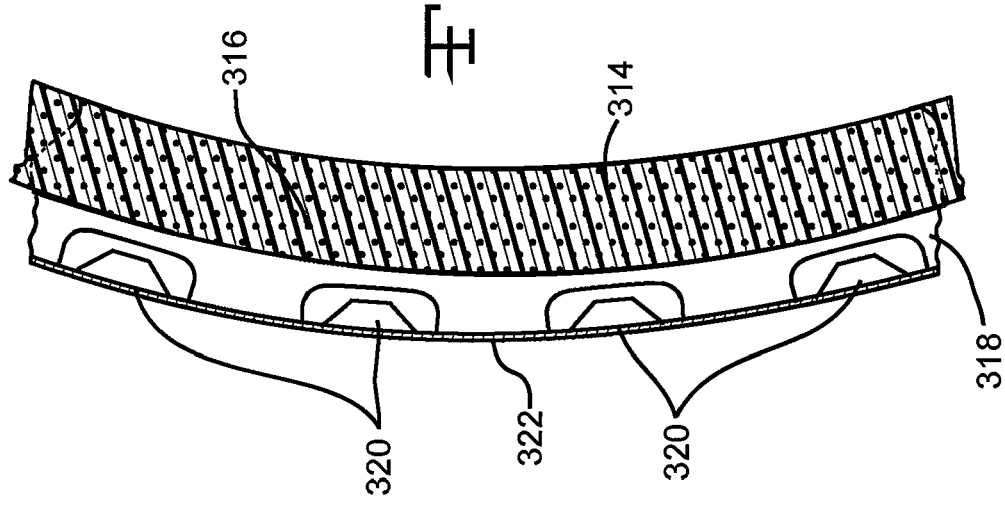
FIG. 4A shows a cross-section view through line 4A-4A of the embodiment of FIG. 4.
Figure 4B:
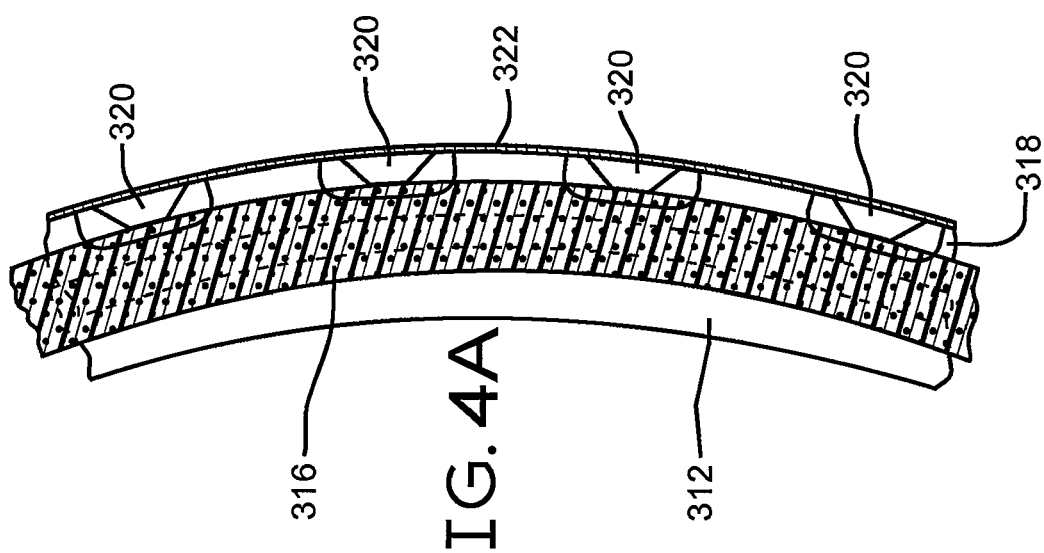
FIG. 4B shows a cross-section view through line 4B-4B of the embodiment of FIG. 4.

FIG. 4A shows a cross-section view through line 4A-4A of the embodiment of FIG. 4. FIG. 4B shows a cross-section view through line 4B-4B of the embodiment of FIG. 4. As shown in FIGS. 4A and 4B, the foam insulation member 316 may be concave shaped to aid in retaining the foam insulation member 316 between the first and second frame members 312 and 314 without fastening elements. A 9 g drop test was conducted on the embodiment of FIG. 4. The drop test revealed that the foam insulation member 316 stayed in position between the first and second frame members 312 and 314 with no movement.

Figure 5:
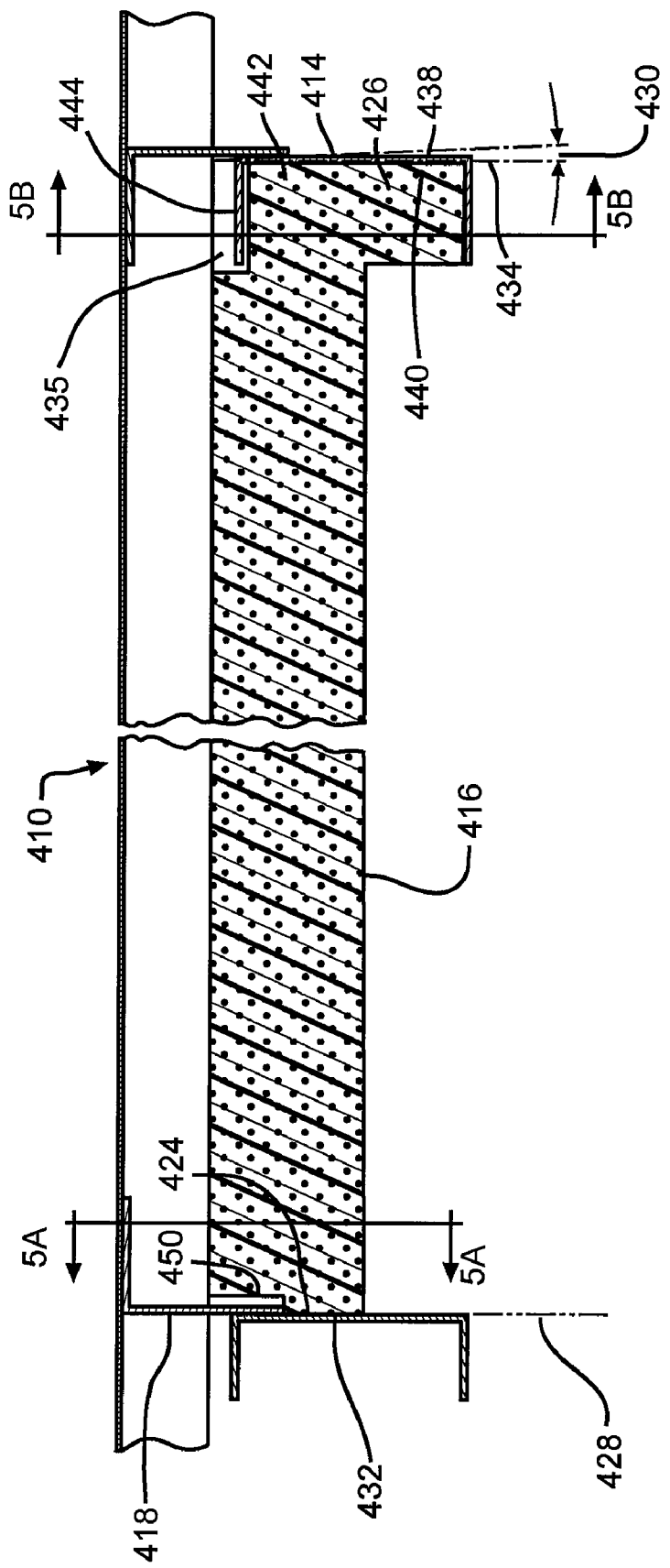
FIG. 5 shows a partial side view of an additional embodiment of a device.

FIG. 5 shows a partial side view of another embodiment of a device 410. The first end 424 of the foam insulation member 416 is disposed vertically with an angle 428 of 0 degrees with respect to the vertical plane 432. The first end 424 may be defined by a notch 450 into which one of the shear-ties 418 may be disposed. The second end 426 of the foam insulation member 416 may have an angle 430 with respect to the vertical plane 434 of 5 degrees. The second end 426 of the foam insulation member 416 may fill the entire open C-shaped portion 438 of the second frame member 414. A flange portion 444 of the open C-shaped portion 438 of the second frame member 414 may be disposed in notch 435 of the second end 426. A front portion 440 of the second end 426 of the foam insulation member 416 may be compressed more than a back portion 442 of the second end 426.

FIG. 5A shows a cross-section view through line 5A-5A of the embodiment of FIG. 5. FIG. 5B shows a cross-section view through line 5B-5B of the embodiment of FIG. 5. As shown in FIGS. 5A and 5B, the foam insulation member 416 may be concave shaped to aid in retaining the foam insulation member 416 between the first and second frame members 412 and 414 without fastening elements. A 9 g drop test was conducted on the embodiment of FIG. 5. The drop test revealed that the foam insulation member 416 stayed in position between the first and second frame members 412 and 414, with a small amount of movement.

Figure 6:
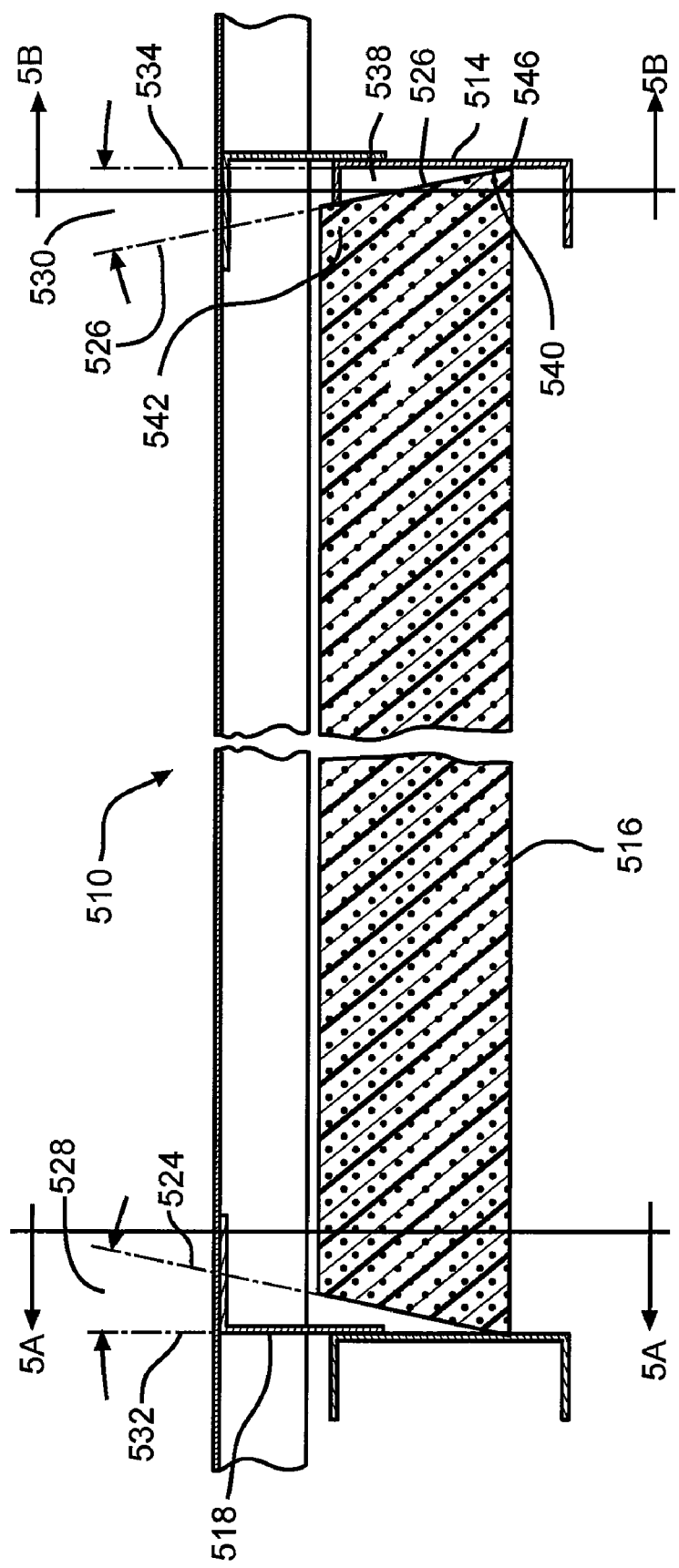
FIG. 6 shows a partial side view of another embodiment of a device.

FIG. 6 shows a partial side view of another embodiment of a device 510. The first end 524 of the foam insulation member 516 is disposed at an angle 528 of 12 degrees with respect to the vertical plane 532. The second end 526 of the foam insulation member 516 is disposed at an angle 530 of 12 degrees with respect to the vertical plane 534. The second end 526 of the foam insulation member 516 may fill only part 546 of the open C-shaped portion 538 of the second frame member 514. A front portion 540 of the second end 526 of the foam insulation member 516 may be compressed more than a back portion 542 of the second end 526.

Figure 6B:
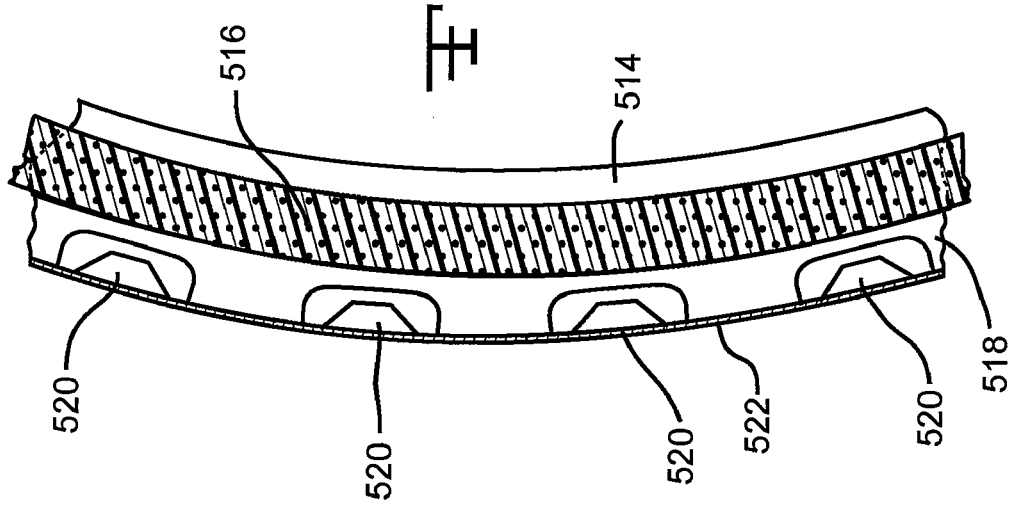
FIG. 6B shows a cross-section view through line 6B-6B of the embodiment of FIG. 6.
Figure 6A:
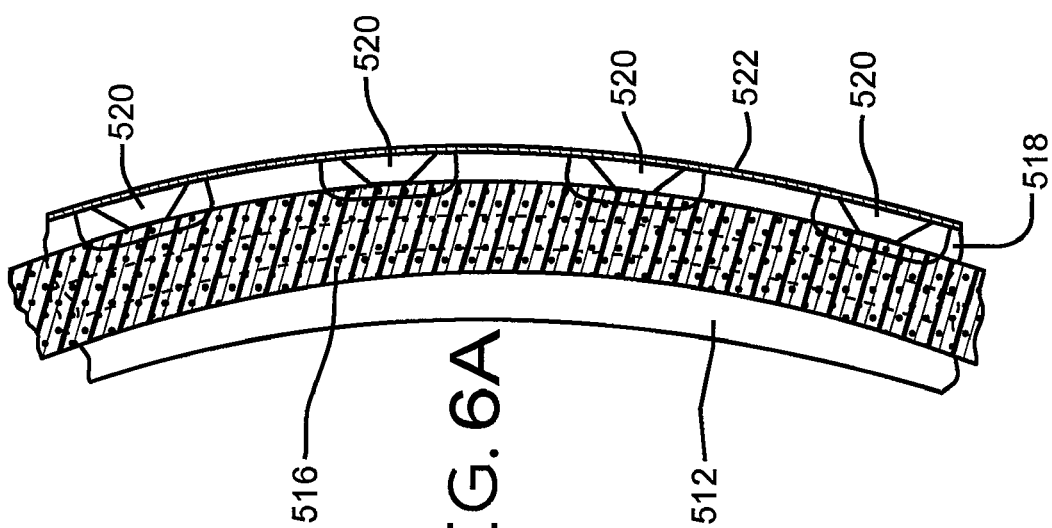
FIG. 6A shows a cross-section view through line 6A-6A of the embodiment of FIG. 6.

FIG. 6A shows a cross-section view through line 6A-6A of the embodiment of FIG. 6. FIG. 6B shows a cross-section view through line 6B-6B of the embodiment of FIG. 6. As shown in FIGS. 6A and 6B, the foam insulation member 516 may be concave shaped to aid in retaining the foam insulation member 516 between the first and second frame members 512 and 514 without fastening elements. A 9 g drop test was conducted on the embodiment of FIG. 6. The drop test revealed that the foam insulation member 516 stayed in position between the first and second frame members 512 and 514 with no movement.

Figure 7:
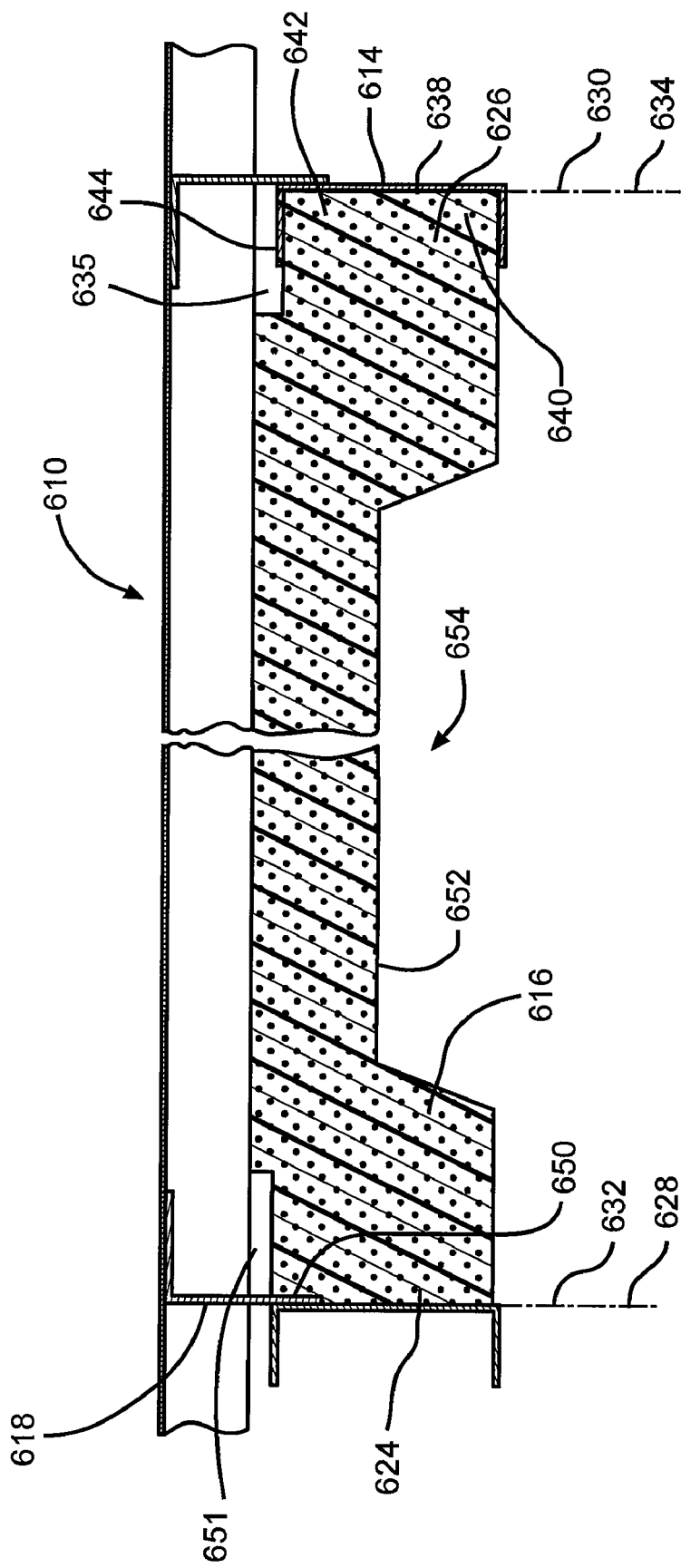
FIG. 7 shows a partial side view of still another embodiment of a device.

FIG. 7 shows a partial side view of another embodiment of a device 610. The first end 624 of the foam insulation member 616 is disposed vertically with an angle 628 of 0 degrees with respect to the vertical plane 632. The first end 624 may be defined by two notches 650 and 651. One of the shear-ties 618 may be disposed into notch 650. The second end 626 of the foam insulation member 616 may have an angle 630 with respect to the vertical plane 634 of 5 degrees. The second end 626 of the foam insulation member 616 may fill the entire open C-shaped portion 638 of the second frame member 614. A flange portion 644 of the open C-shaped portion 638 of the second frame member 614 may be disposed in notch 635 of the second end 626. A front portion 640 of the second end 626 of the foam insulation member 616 may be compressed more than a back portion 642 of the second end 626. A front portion 652 of the foam insulation member 616 may be defined by a cut-out area 654 to relieve weight and to assist in installation.

Figure 8:
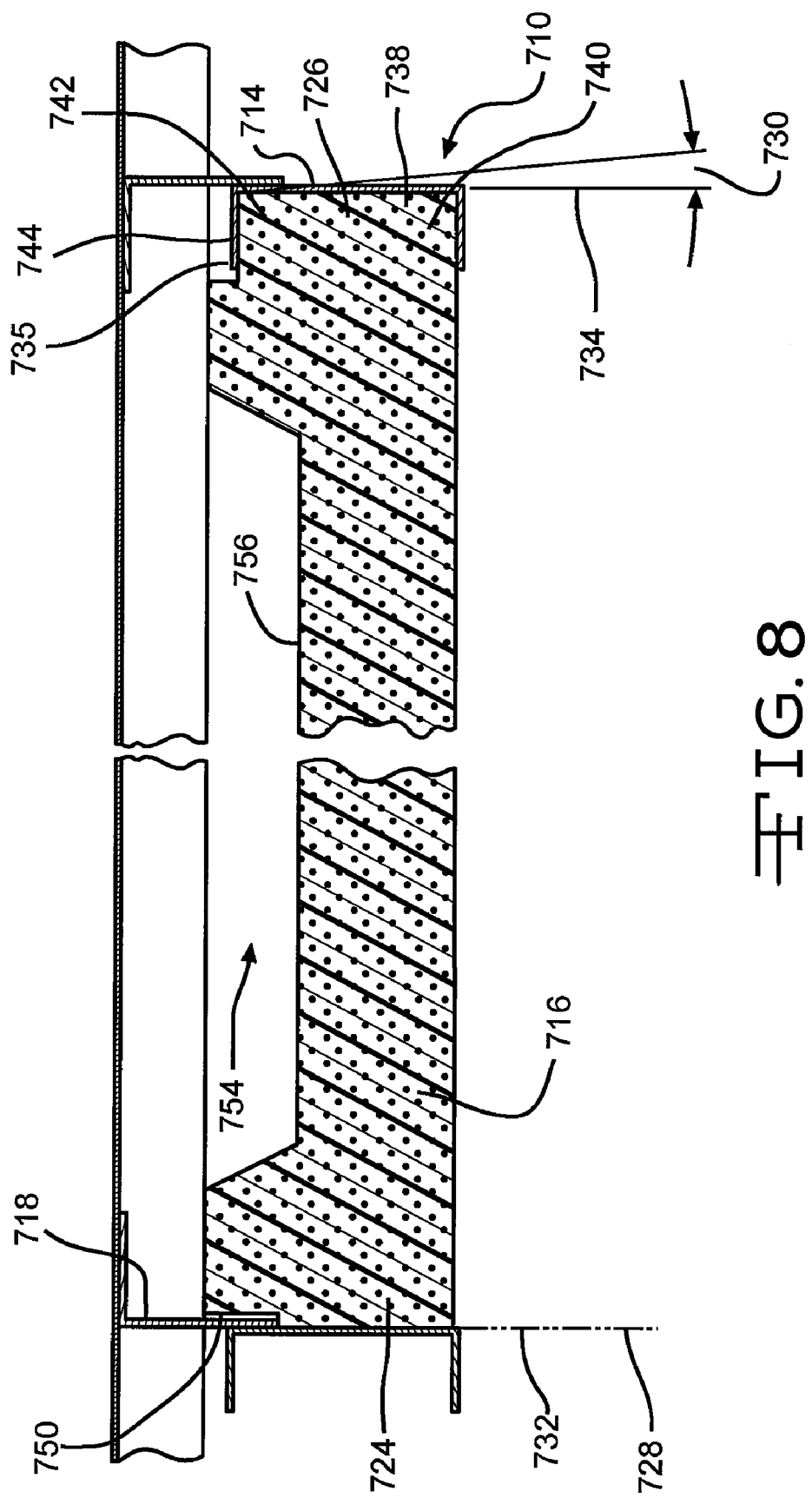
FIG. 8 shows a partial side view of yet another embodiment of a device.

FIG. 8 shows a partial side view of another embodiment of a device 710. The first end 724 of the foam insulation member 716 is disposed vertically with an angle 728 of 0 degrees with respect to the vertical plane 732. The first end 724 may be defined by notch 750 into which one of the shear-ties 718 may be disposed. The second end 726 of the foam insulation member 716 may have an angle 730 with respect to the vertical plane 734 of 5 degrees. The second end 726 of the foam insulation member 716 may fill the entire open C-shaped portion 738 of the second frame member 714. A flange portion 744 of the open C-shaped portion 738 of the second frame member 714 may be disposed in notch 735 of the second end 726. A front portion 740 of the second end 726 of the foam insulation member 716 may be compressed more than a back portion 742 of the second end 726. A back portion 756 of the foam insulation member 716 may be defined by a cut-out area 754 to relieve weight and to assist in installation.

Figure 9:
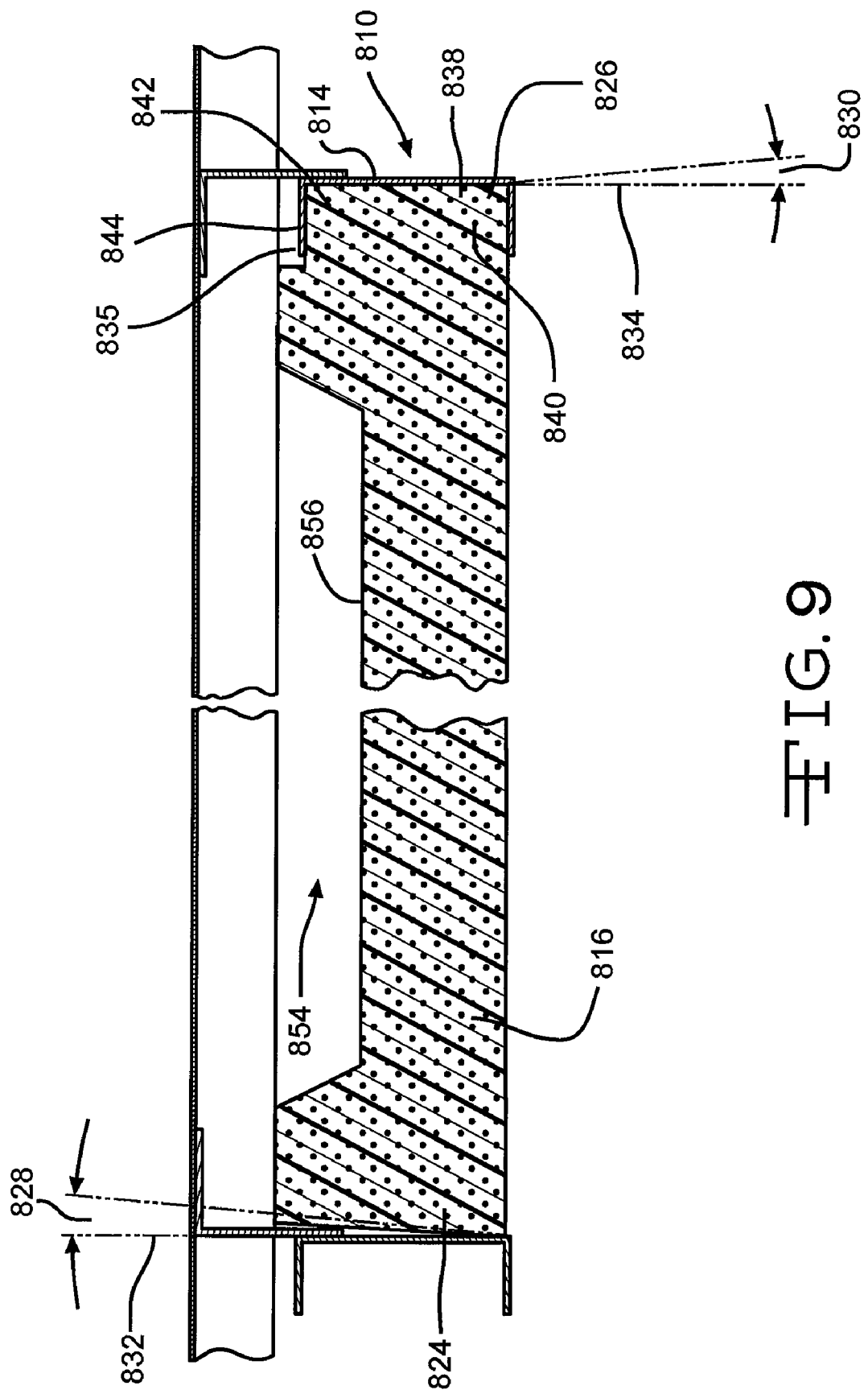
FIG. 9 shows a partial side view of an additional embodiment of a device.

FIG. 9 shows a partial side view of another embodiment of a device 810. The first end 824 of the foam insulation member 816 is disposed at an angle 828 of 5 degrees with respect to the vertical plane 832. The second end 826 of the foam insulation member 816 may have an angle 830 with respect to the vertical plane 834 of 5 degrees. The second end 826 of the foam insulation member 816 may fill the entire open C-shaped portion 838 of the second frame member 814. A flange portion 844 of the open C-shaped portion 838 of the second frame member 814 may be disposed in notch 835 of the second end 826. A front portion 840 of the second end 826 of the foam insulation member 816 may be compressed more than a back portion 842 of the second end 826. A back portion 856 of the foam insulation member 816 may be defined by a cut-out area 854 to relieve weight and to assist in installation.

Variations may be made in any of the disclosed embodiments. For instance, the angles from a vertical plane of the first and second ends of the foam insulation member may be changed in the range of 0 to 15 degrees, as long as one of the first and second ends is at an angle of greater than 0 degrees. Similarly, the numbers, types, configurations, and sizes of the notices in the first and second ends of the foam insulation member may be varied. Likewise, the numbers, types, configurations, and sizes of the cut-out areas in the front and/or back of the foam insulation member may be varied. Moreover, changes may be made to whether or not the second end of the foam insulation member completely fills or only partly fills the open C-shaped portion of the second frame member. Additionally, the size, type, orientation, and configuration of the foam insulation member may be varied. In still other embodiments, additional changes may be made to any of the disclosed embodiments. For instance, the foam insulation member in any of the embodiments may be completely covered by a reinforced polymeric film which is taped and/or sealed. The coefficient of friction of the film may aid in the self-supporting position of the foam insulation member.

FIG. 10 shows one embodiment of a method 960 of installing insulation in a device. The device may comprise any of the embodiments disclosed herein. In one step 962, a foam insulation member is provided having first and second ends. At least one of the first and second ends may be disposed at an angle greater than 0 degrees relative to a vertical plane. In other embodiments, the foam insulation member may comprise any of the embodiments disclosed herein. In another step 964, the first and second ends of the foam insulation member may be disposed between first and second frame members of the device to provide thermal and acoustic insulation to the device. The foam insulation member may be fixedly held in place between the first and second frame members due to a friction fit resulting from the foam insulation member being disposed between the first and second frame members in compression.

In one embodiment, step 964 may further comprise extending the first and second ends of the foam insulation member between a closed C-shaped portion of the first frame member and an open C-shaped portion of the second frame member. In still another embodiment, step 964 may further comprise filling the open C-shaped portion of the second frame member with the second end of the foam insulation member. In yet another embodiment, step 964 may further comprise filling only part of the open C-shaped portion of the second frame member with the second end of the foam insulation member. In an additional embodiment, step 964 may further comprise compressing a front portion of at least one of the first and second ends of the foam insulation member more than a back portion.

One or more of the embodiments of the disclosure may provide for the self-retention, without the assistance of fastening elements, under both normal vibration and mechanical shock loads (i.e. hard landing stresses), of a low density foam insulation member between first and second frame members of a device. This may reduce weight of the device, may reduce assembly time, may reduce costs, and/or may reduce one or more other problems of one or more of the existing devices.

It should be understood, of course, that the foregoing relates to exemplary embodiments of the disclosure and that modifications may be made without departing from the spirit and scope of the disclosure as set forth in the following claims.

The invention claimed is:

1. An aeronautical device comprising:
   first and second frame members;
   a foam insulation member having a front side and a back side and first and second ends disposed between the front side and the back side, wherein at least one of the first and second ends is linearly angled in only an inward direction from the front side of the foam insulation member to the back side of the foam insulation member at an angle relative to a vertical plane of greater than 0 degrees, and the foam insulation member provides thermal and acoustic insulation to the aeronautical device;
   wherein the first and second ends of the foam insulation member extend between the first and second frame members in compression, and the foam insulation member is self-retained, without the use of fasteners, between the first and second frame members due to a friction fit resulting from the foam insulation member being disposed between the first and second frame members in compression.

2. The aeronautical device of claim 1 wherein the aeronautical device is at least one of an aerospace fuselage, an aerospace ducting, a missile, a satellite, an aerospace vehicle, an aerospace tank, or aerospace piping.

3. The aeronautical device of claim 1 wherein the first and second ends of the foam insulation member extend between a closed C-shaped portion of the first frame member and an open C-shaped portion of the second frame member.

4. The aeronautical device of claim 3 wherein the second end of the foam insulation member fills only part of the open C-shaped portion of the second frame member.

5. The aeronautical device of claim 3 wherein the second end of the foam insulation member fills the open C-shaped portion of the second frame member.

6. The aeronautical device of claim 1 wherein the first and second frame members are attached to shear-ties.

7. The aeronautical device of claim 6 wherein the shear-ties are attached to stringers and skin.

8. The aeronautical device of claim 1 wherein the foam insulation member has a density of less than 0.4 pounds per cubic feet.

9. The aeronautical device of claim 1 wherein the first and second ends of the foam insulation member are each linearly angled in only inward directions from the front side of the foam insulation member to the back side of the foam insulation member at angles relative to the vertical plane substantially between 0 and 15 degrees, wherein at least one of the angles is at least 3 degrees.

10. The aeronautical device of claim 9 wherein at least one of the angles is at least 5 degrees.

11. The aeronautical device of claim 1 wherein at least one of the first and second ends of the foam insulation member is defined by at least one notch at the back side of the foam insulation member.

12. The aeronautical device of claim 1 wherein at least one of the front and back sides of the foam insulation member is defined by a cut-out area cutting out a portion of the foam insulation member between the first and the second ends.

13. The aeronautical device of claim 1 wherein the foam insulation member is concave shaped.

14. The aeronautical device of claim 1 wherein the front side of the foam insulation member is compressed more than the back side of the foam insulation member.

15. The aeronautical device of claim 1 wherein the foam insulation member is covered by a film.

16. A method of installing insulation in an aeronautical device comprising:
    providing a foam insulation member having a front side and a back side and first and second ends, wherein at least one of the first and second ends is linearly angled in only an inward direction from the front side of the foam insulation member to the back side of the foam insulation member at an angle relative to a vertical plane of greater than 0 degrees;
    disposing in compression the first and second ends of the foam insulation member between first and second frame members of the aeronautical device to provide thermal and acoustic insulation to the aeronautical device;
    and self-retaining the foam insulation member, without the use of fasteners, between the first and second frame members due to a friction fit resulting from the foam insulation member being disposed between the first and second frame members in compression.

17. The method of claim 16 wherein the method is used to self-retain the foam insulation member in an aeronautical device comprising at least one of an aerospace fuselage, an aerospace ducting, a missile, a satellite, an aerospace vehicle, an aerospace tank, or aerospace piping.

18. The method of claim 16 wherein the disposing step further comprises extending the first and second ends of the foam insulation member between a closed C-shaped portion of the first frame member and an open C-shaped portion of the second frame member.

19. The method of claim 18 wherein the disposing step further comprises filling the open C-shaped portion of the second frame member with the second end of the foam insulation member.

20. The method of claim 18 wherein the disposing step further comprises filling only part of the open C-shaped portion of the second frame member with the second end of the foam insulation member.

21. The method of claim 16 wherein the first and second frame members are attached to shear-ties.

22. The method of claim 21 wherein the shear-ties are attached to stringers and skin.

23. The method of claim 16 wherein the foam insulation member has a density of less than 0.4 pounds per cubic feet.

24. The method of claim 16 wherein the first and second ends of the foam insulation member are each linearly angled in only inward directions from the front side of the foam insulation member to the back side of the foam insulation member at angles relative to the vertical plane substantially between 0 and 15 degrees, wherein at least one of the angles is at least 3 degrees.

25. The method of claim 24 wherein at least one of the angles is at least 5 degrees.

26. The method of claim 16 wherein at least one of the first and second ends of the foam insulation member is defined by at least one notch at the back side of the foam insulation member.

27. The method of claim 16 wherein at least one of the front and back sides of the foam insulation member is defined by a cut-out area cutting out a portion of the foam insulation member between the first and the second ends.

28. The method of claim 16 wherein the foam insulation member is concave shaped.

29. The method of claim 16 wherein the disposing step further comprises compressing the front side of the foam insulation member more than the back side of the foam insulation member.

30. The method of claim 16 wherein the foam insulation member is covered by a film.

* * * * *